United States Patent
Ji

(10) Patent No.: US 11,544,518 B2
(45) Date of Patent: *Jan. 3, 2023

(54) DEACTIVATABLE METAL TAG

(71) Applicant: CHECKPOINT SYSTEMS, INC., Thorofare, NJ (US)

(72) Inventor: Zhonghe Ji, Avon, CT (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,939

(22) Filed: May 24, 2021

(65) Prior Publication Data

US 2021/0312255 A1    Oct. 7, 2021

Related U.S. Application Data

(63) Continuation-in-part of application No. 16/623,580, filed as application No. PCT/US2018/039026 on Jun. 22, 2018, now Pat. No. 11,276,286.

(60) Provisional application No. 63/028,621, filed on May 22, 2020, provisional application No. 62/523,676, filed on Jun. 22, 2017.

(51) Int. Cl.
*G06K 19/077* (2006.01)
*H01F 27/40* (2006.01)
*H01F 27/24* (2006.01)
*H01F 27/28* (2006.01)

(52) U.S. Cl.
CPC ....... *G06K 19/07788* (2013.01); *H01F 27/24* (2013.01); *H01F 27/28* (2013.01); *H01F 27/40* (2013.01)

(58) Field of Classification Search
CPC .......... G06K 19/07779; G08B 13/2408; G08B 13/2414; G08B 13/2431; G08B 13/2437; G08B 13/2442

See application file for complete search history.

(56) References Cited

U.S. PATENT DOCUMENTS

| | | | |
|---|---|---|---|
| 4,654,641 A | | 3/1987 | Ferguson et al. |
| 5,576,693 A | * | 11/1996 | Tyren ............... G01B 7/003 340/551 |
| 6,229,444 B1 | | 5/2001 | Endo et al. |

(Continued)

FOREIGN PATENT DOCUMENTS

| | | |
|---|---|---|
| EP | 0609957 | 8/1994 |
| EP | 0807912 | 11/1997 |

(Continued)

OTHER PUBLICATIONS

Patent Cooperation Treaty (PCT), International Search Report and Written Opinion for Application PCT/US2018/039026 filed Jun. 22, 2018, dated Nov. 27, 2018, International Searching Authority, EP.

(Continued)

*Primary Examiner* — Mirza F Alam
(74) *Attorney, Agent, or Firm* — McDonald Hopkins LLC

(57) ABSTRACT

A detectable label and associated methods of making a detectable label are provided. One example of the detectable label may include a coil and a capacitor arranged in an LC circuit. The flux direction of the LC circuit is generally parallel a package when the detectable label is attached to the package.

15 Claims, 20 Drawing Sheets

(56) References Cited

U.S. PATENT DOCUMENTS

| | | | |
|---|---|---|---|
| 2002/0097153 A1* | 7/2002 | Youbok | G06K 19/0726 340/572.5 |
| 2005/0007296 A1* | 1/2005 | Endo | G06K 19/07749 343/895 |
| 2005/0179552 A1 | 8/2005 | Shoji et al. | |
| 2006/0255945 A1* | 11/2006 | Egbert | G06K 19/07749 340/572.7 |
| 2011/0124299 A1 | 5/2011 | Koujima et al. | |

FOREIGN PATENT DOCUMENTS

| | | | | |
|---|---|---|---|---|
| WO | 9221113 A1 | 11/1992 | | |
| WO | 200017835 | 3/2000 | | |
| WO | WO-0017835 A1 * | 3/2000 | | G08B 13/244 |
| WO | 2018237281 A1 | 12/2018 | | |

OTHER PUBLICATIONS

Office Action dated Jul. 5, 2022; Japanese Patent Application No. 2019-571327 filed Dec. 23, 2019.

\* cited by examiner

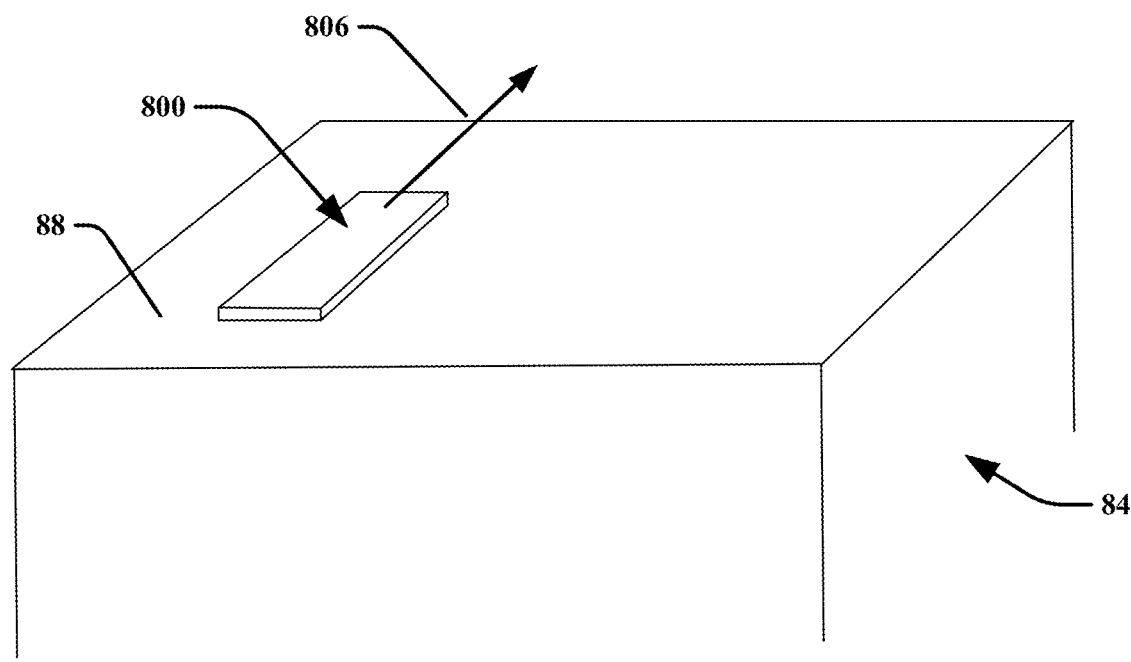
FIG. 8A
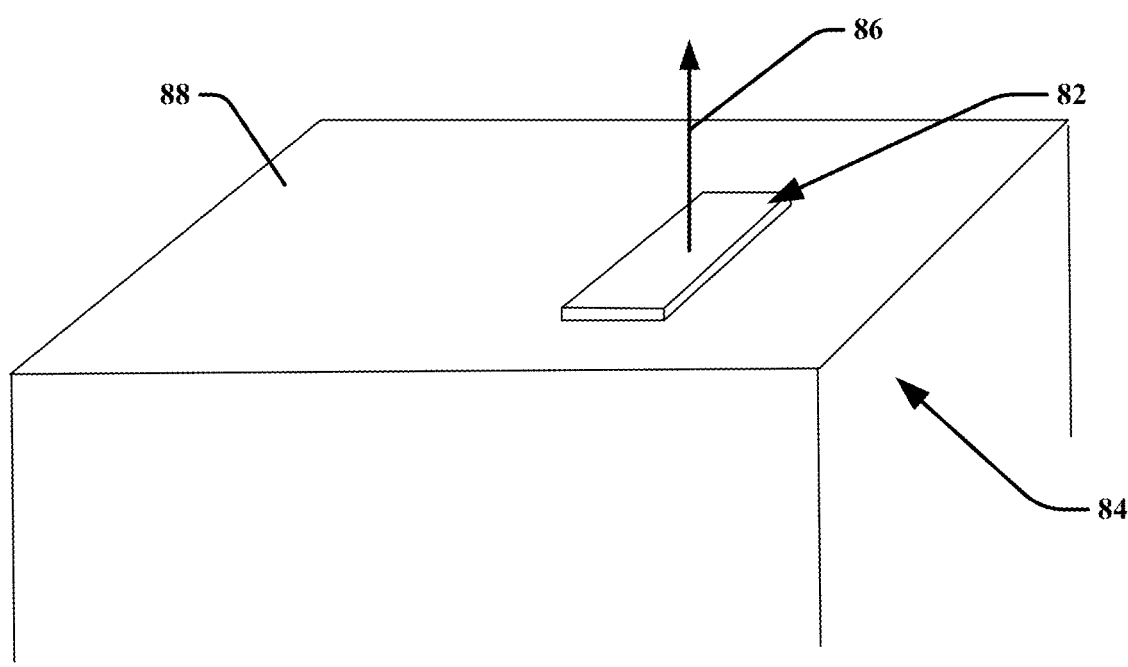
PRIOR ART    FIG. 8B

DEACTIVATABLE METAL TAG

CROSS-REFERENCE TO RELATED APPLICATION

This application claims priority to U.S. Provisional Patent Application No. 63/028,621 entitled "DEACTIVATABLE METAL TAG," filed on Jun. 22, 2017 and is a continuation-in-part of U.S. patent application Ser. No. 16/623,580, entitled "DETECTABLE FOLDED COIL," filed on Dec. 17, 2019, which is a national stage entry of International Application No. PCT/US2018/039026, entitled "DETECTABLE FOLDED COIL," filed on Jun. 22, 2018, which claims priority to U.S. Provisional Patent Application No. 62/523,676 entitled "DETECTABLE FOLDED COIL," filed on Jun. 22, 2017, all of which are incorporated herein by reference in their entirety.

TECHNICAL FIELD

The present disclosure relates to radio frequency (RF) devices and methods, and more specifically to RF resonant labels for electronic article surveillance.

BACKGROUND

RF labels (sometimes referred to as "electronic article surveillance labels" or "EAS labels") are commonly used in a number of settings, including in retail loss prevention. In this regard, retail theft prevention systems, often referred to as EAS systems, use antennas located at the exits of a retail establishment to detect RF labels that are affixed to sale items. An RF label may be affixed to a sale item, and if the label is not deactivated at a point-of-sale during a sales transaction, an EAS system will detect the RF label when the RF label is in within range of the EAS system. The EAS system is often disposed near the exit of a store so that the range monitors for RF labels leaving the store.

For instance, the EAS system uses a transmitter to emit a signal at a predetermined RF frequency. The RF label is tuned to the predetermined frequency so that it responds to the signal and a receiver detects the RF label response. This response can then be used for determining whether to set off an alarm or not. An alarm may be triggered because the removal of an active RF label from the retail establishment is likely to be associated with an attempted theft. Because the RF labels are affixed to external surfaces of the items, the size of the labels is a concern because the labels can obscure product packaging and information.

In another aspect, traditional EAS labels may not work when applied to a package with electric conducted surface, such as metal boxes, cans, aluminum foil bags or packages decorated with metalized ink or foils. For example, traditional EAS labels are passive RF labels and do not work when they are applied to energy beverages, cosmetic products, or the like. Accordingly, many items, especially prone to theft, in a store may not include EAS labels.

There remains a need to provide EAS labels capable of detection on different types of sale items, including metal packages or metalized decorated packages. Moreover, there is a need for smaller more efficient, effective, and compact EAS labels.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

According to various examples, a folded coil label is provided. A folded coil label may be constructed in relative small size dimensions. An example folded label may comprise a core, a coil, and a capacitor. The core may include a ferrite. According to some example embodiments, the core may include a ferrite and a spacer comprised of, for example, paper. According to some example embodiments, the core may be comprised of a first layer including a ferrite, a second layer including a spacer, and a third layer including a ferrite. In some other examples, the core may include ferrite and no spacer.

The coil may be formed by a conductor that follows a helical path around the coil. The coil may be formed by wrapping angled traces formed on an etched conductive sheet around the core and welding the traces in series to form the coil as a helix. A first end of the coil may be connected to a first plate of the capacitor and a second end of the coil may be connected to a second plate of the capacitor. In this regard, the capacitor may comprise two parallel plates that are formed on either side of a dielectric layer. According to some example embodiments, the capacitor may include a deactivation spot.

Also described herein is a foldable label comprising a core, a capacitor comprising a dielectric layer disposed between a top plate and a bottom plate, and a coil wrapped around the core and connected to the capacitor to form a resonant circuit. The coil may be formed of angled traces wrapped around the core to form turns such that each turn is electrically and physically connected in series to an adjacent angled turn to form a helical structure of the coil. The core may comprise at least one ferrite layer and may comprise a spacer layer. The spacer layer may comprise a non-conductive or ferrous flexible member. In some examples, the foldable label may comprise a liner, wherein the resonant circuit is disposed above the liner. At least one metal layer may be disposed between the liner and the resonant circuit. The at least one metal layer may comprise a thickness between about 40-80 microns. At least one spacer layer may be disposed between the liner and the resonant circuit. The at least one spacer layer may comprise a mass per unit area of between about 160 to 500 g/m². It is noted that the foldable label may comprise at least one spacer layer disposed between the liner and the resonant circuit independent of a metal layer. For instance, wherein a space between the resonate circuit and the liner may be free of metal. Moreover, a space between the resonate circuit and the liner may be free of metal and the core may be free of metal, such that the label comprises no metal other than the coil. For instance at least a portion of the top plate may be disposed between the core and the liner. Moreover, the resonate circuit may comprise a laser tuned resonant circuit.

In some embodiments, a foldable label may comprise a core, a capacitor comprising a dielectric layer disposed between a top plate and a bottom plate, a coil wrapped around the core and connected to the capacitor to form a resonant circuit, a liner disposed beneath the resonant circuit, and at least one metal layer disposed between the liner and the resonant circuit, wherein the at least one metal layer comprises a thickness between about 40-80 microns. In at least one example, the bottom plate is generally coplanar with a bottom of the coil. In another aspect, the capacitor is horizontally adjacent to the coil.

In another aspect, a foldable label may comprise a resonant circuit comprising, a core comprising a ferrite material, a capacitor comprising a dielectric layer disposed between a top plate and a bottom plate, a coil comprising angled traces that wrap around the core, and welds operatively coupled adjacent angles traces together to form a generally helical shaped coil, a liner disposed beneath the resonant circuit, and at least one metal layer disposed between the liner and the resonant circuit. The top plate may be disposed at least partially below the core. In another aspect, the bottom plate is disposed at least partially below the core. It is noted that the dielectric layer may form at least a portion of the coil.

According to various examples, a detectable label comprises a capacitor, and a coil comprising a first end and a second end, wherein the first end of the coil is coupled to a first plate of the capacitor and a second end of the coil is attached to a second plate of the capacitor to form an LC circuit, wherein a flux direction of the LC circuit is generally parallel with a surface when the detectable label is operatively attached to the surface. In an example, coil is wound around the core. The core may comprise ferrite material. The detectable label may comprise a housing operatively housing the coil. The detectable label may comprise an insulator disposed between the coil and the capacitor. The detectable label may comprise a shield disposed proximal the capacitor. The detectable label may comprise a spacer disposed between the shield and the capacitor. The coil may comprise a copper wire.

The following description and the drawings disclose various illustrative aspects. Some improvements and novel aspects may be expressly identified, while others may be apparent from the description and drawings.

DESCRIPTION OF THE DRAWINGS

The present teachings may be better understood by reference to the following detailed description taken in connection with the following illustrations, wherein:

FIG. 8A is an EAS label with a flux direction generally parallel a packaging in accordance with various disclosed aspects;

FIG. 8B is a prior art EAS label with a flux direction generally non-parallel a packaging in accordance with various disclosed aspects;

DETAILED DESCRIPTION

Figure 1A:
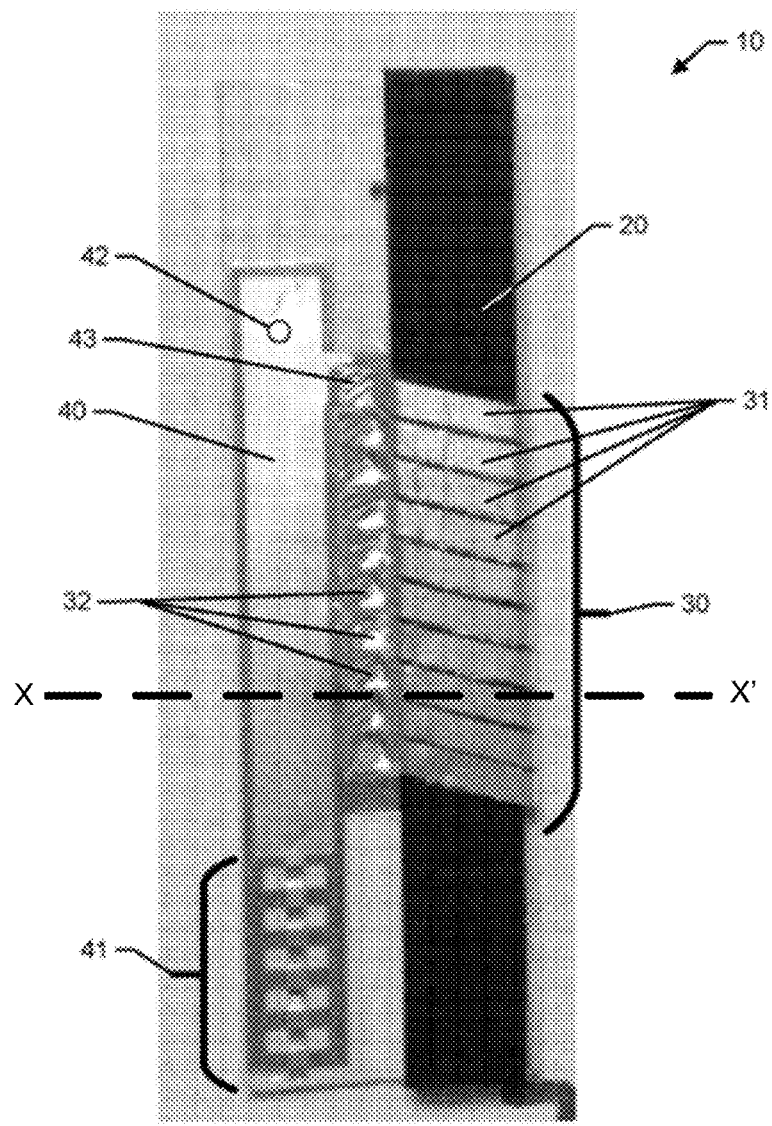
FIG. 1A is a top view of a foldable label in accordance with various disclosed aspects

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "label," "RF label," "EAS label," "tag," and the like may be used interchangeably, unless context suggests otherwise or warrants a particular distinction among such terms. It is further noted that RF labels may be chosen based on a frequency (e.g., low frequency RF label for close communication). Identification tags may comprise printable RF labels, RF labels that include microchips, or the like. RF labels can contain stored information, such as in a memory (e.g., read-only memory (ROM), random access memory (RAM), electrically erasable programmable read-only memory (EEPROM), or various other types of memory). In another aspect, an RF label may be powered by electromagnetic induction from magnetic fields produced by a transmitter/receiver. For instance, an RF label may include an EAS label tuned for a specific frequency. The label may include an antenna and may comprise various materials, such as aluminum.

In some traditional systems, RF and/or EAS labels may not be detectable when attached to certain products, such as metal products or products containing metal. Attempts to solve this and other shortcomings have resulted in large and costly labels. As such, RF EAS passive labels typically do not work when they are applied to the surface of metal packaging boxes or cans, nor on metalized decorated packages. Attempts have resulted in false alarms as the frequency of the label's range to antenna demonstrates high failure rates when the RF and/or EAS labels are attached to metal articles. This may include cans, metal lids, foil wrapped or foil bagged products, and other types of metal objects. The metal of the article may interfere with the RF and/or EAS label's ability to receive or respond to a signal from a receiver/transmitter. Embodiments described herein address these and other issues. In another aspect, such labels often require small label footprints to be used on the surface of small metal package, such as energy beverages, and cosmetic products.

Described herein are labels that may be detectable on such packaging or products. In another aspect, described labels may provide footprints that are small enough to be applied to various products. It is further noted that embodiments may provide a cost-effective and efficient label that may reduce shrinkage of goods as such labels may be detectable to reduce or deter potential thefts from a retailer.

In an example, described EAS labels may include a passive LC circuit comprising a coil (e.g., inductor) and a capacitor. The capacitor may be deactivatable or non-deactivatable. The flux direction of the coil may be generally parallel to a label facesheet. This flux direction allows the EAS label to be detectable by a detector, such as an RF signal receiver located on a retail premises. It is noted that described EAS labels may include a ferrite bar disposed within the coil that may be utilized. In some embodiments, a spacer and a shield may be disposed between the coil and the facesheet or the product.

It is noted that the EAS label may include a liner. The liner may be removed to allow the EAS label to be attached to a sale item or article utilizing pressure sensitive adhesive. It is noted that labels may also be attached to various types of articles using other attachment media such as glues, transfers, crimps, sewn thread and other methodologies. unless context suggests otherwise or a particular distinction is made. For instance, EAS labels may be attached to paper, plastic, metal, cardboard, cloth, or the like. Moreover, EAS labels may be utilized in traditional physical stores, online stores, or other types of retailers. As described herein, the EAS label may be a passive transponder that collects energy from interrogating radio waves.

Figure 1B:
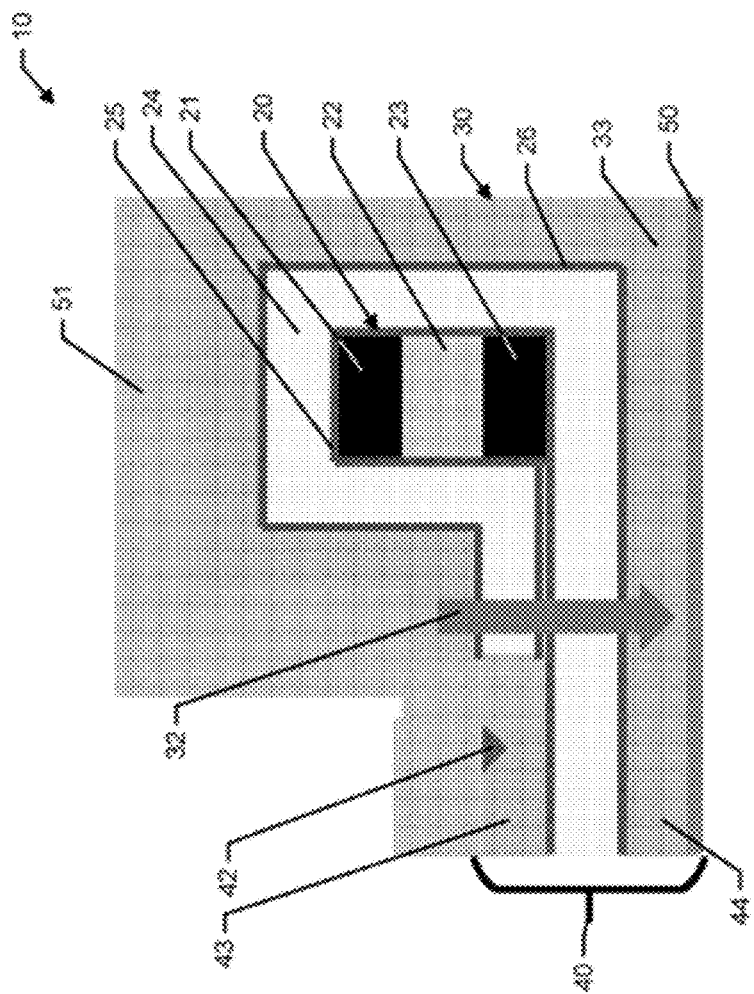
FIG. 1B is a cross-sectional view of the foldable label of FIG. 1A taken along line X-X' in accordance with various disclosed aspects.

FIGS. 1A-1B show an example label 10 according to some example embodiments. In this regard, the label 10 may be comprised of a ferrite core 20, a coil 30, and a capacitor 40. As further described below, the ferrite core 20 may be comprised of multiple layers with a first layer being a ferrite layer, a second layer being a spacer (e.g., a non-conductive or ferrous flexible member), and a third layer being another ferrite layer. The spacer may comprise, for example, a paper or a synthetic paper. The ferrite layers may be formed of a flexible ferrite to increase the label's physical flexibility.

The coil 30 may be formed of a conductive material (e.g., aluminum or the like) and may be comprised of any number of turns 31. The turns 31 of the coil 30 may be in a helical structure wrapped around the ferrite core 20, with each end of the coil 30 being connected to a respective plate of the capacitor 40. To form the turns 31, the conductive material may be, for example, etched from a planar sheet of the conductive material into a plurality of angled traces that are wrapped around the core 20 to form the turn 31. The helical or spiral nature of the coil 30 may then be formed by connecting each turn 31 to an adjacent turn in series by, for example, crimping or welding, such as through welds 32, each turn 31 to an adjacent turn.

As mentioned above, the coil 30 may be connected, at each end of the coil 30, to a respective plate of the capacitor 40. With reference to FIG. 1A, the top or upper plate is viewable. The plates of the capacitor 40 may be connected to the ends of the coil 30 by welding or crimping to a lead, landing, or pad connected to the capacitor plate.

By connecting the capacitor 40 to the coil 30, an inductor-capacitor or LC circuit may be formed. The inductance of the coil 30 and the capacitance of the capacitor 40 may be selected to form a circuit that resonates in an electromagnetic field of a particular frequency, such as, for example, 8.2 MHz. By resonating in the field, the circuit and the label 10 may return an RF signal that may be detected by an antenna. As such, the label 10 may be employed as an EAS label, and for example, trigger an alarm to sound due to an apparent theft event of a product affixed to the label 10.

To tune the LC circuit for a particular frequency of operation, the structure of the capacitor 40 may be modified. In this regard, the area of the capacitor plates may be modified, for example via removal of material from the plates using, for example a laser or using a mechanical technique. A portion of the capacitor 40 area may be allocated for tuning (e.g., area 41). As can be seen in FIG. 1A, in area 41 some of the capacitor plate material has been removed to tune the circuit. It is noted, however, that some embodiments may comprise tighter or less variance in frequency of labels and may not require such tuning.

When the label 10 is used as a non-reusable product security device, the label 10 may require a means for deactivating the label 10 and the LC circuit. In this regard, deactivation typically involves changing the circuit or destroying the circuit's characteristics in such a way that either changes the resonant frequency from a target frequency so that the label 10 can no longer be detected by EAS antennas, or simply eliminate the circuit's ability to resonate at any frequency by destroying the dielectric layer between the plates of the capacitor 40. To facilitate destruction of the dielectric layer between the plates of the capacitor 40, a dimple 42 may be formed on the capacitor 40. The dimple 42 may be formed by creating a weak point in the dielectric (e.g., by a controlled crimp) that allows the capacitor 40 to continue to operate normally until the label 10 is subjected to a relatively high electromagnetic field which causes the dielectric to permanently break down at the dimple 42 location, thereby deactivating the label 10.

FIG. 1B illustrates a cross-section side view of the label 10. As can be seen, the core 20 may be comprised of a first ferrite layer 21, a spacer 22, and a second ferrite layer 23. The ferrite layers 21, 23 may be formed of any type of ferrous material, which may be a flexible ferrous material such as a soft ferrite material (e.g., temporarily magnetized material). The spacer 22 may be formed of any non-ferrous or conducive material. In some example embodiments, the spacer 22 may be a flexible member to give the label 10 an additional degree of flex (e.g., to facilitate for application of the label 10 to non-planar surfaces of a product packaging). In this regard, the spacer 23 may be formed of paper, or a paper like plastic. The cross-section of the core 20 may be provided in a number of different shapes, including, but not limited to, a rectangle, a square, a circle, or the like.

The core 20 may be wrapped with a dielectric layer 24, which may be disposed or placed at the core 20. It is noted that an adhesive layer 25 may form the gap between the plates of the capacitor 40. A conductive layer 33 may form the coil 30 and the lower plate 44 of the capacitor 40. The conductive layer 33 may adhere to the dielectric layer 24 via adhesive layer 26. To form the coil 30, each turn may be welded at a respective weld, such as weld 32. The upper plate 43 of the capacitor may be disposed on an opposite side of the dielectric layer 24 and held in place by the adhesive layer 25. The upper plate 43 of the capacitor 40 may also include the dimple 42. According to some example embodiments, the upper plate 43 may be comprised of a thinner conductor than the conductor used for the lower plate 44.

The label 10 may also include a top sheet 51, which may be added for aesthetic purposes or to include indicia, such as logos or text, on the top surface of the label 10. Further, the label 10 may include a product attach adhesive layer 50, which may, according to some example embodiments, be a hotmelt adhesive to facilitate affixing the label 10 to a retail product.

FIGS. 2A-2H illustrate label 10 various cross-sectional views of the label 10 in different states as it is manufactured according to exemplary methods. In view of the subject matter and views in FIGS. 2A-2H, a method that may be related to various embodiments may be better appreciated with reference to the flowchart of FIG. 3. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

First, a laminate may be provided at 200 and resist ink may be printed on the laminate at 205. Subsequently, a chemical etch may be performed at 206 on the laminate. Additionally, at 201 a bare core may be provided. The bare core may be mounted onto this liner at 202. Further, a method may include die cutting the core, the paper, and a laminate. At 207, the core may be mounted or re-pitched on the etched laminate.

In some embodiments, the method may not utilize a roll format preparation with a liner and adhesive for spotting on the etched coil circuit. For instance, embodiments may utilize direct dispensing of a core material chip in a sheet format instead of a roller format with a liner. It is noted that dispensed or spotted adhesive may be applied to an etched circuit prior to dispensing of the ferrite core.

Figure 2A:
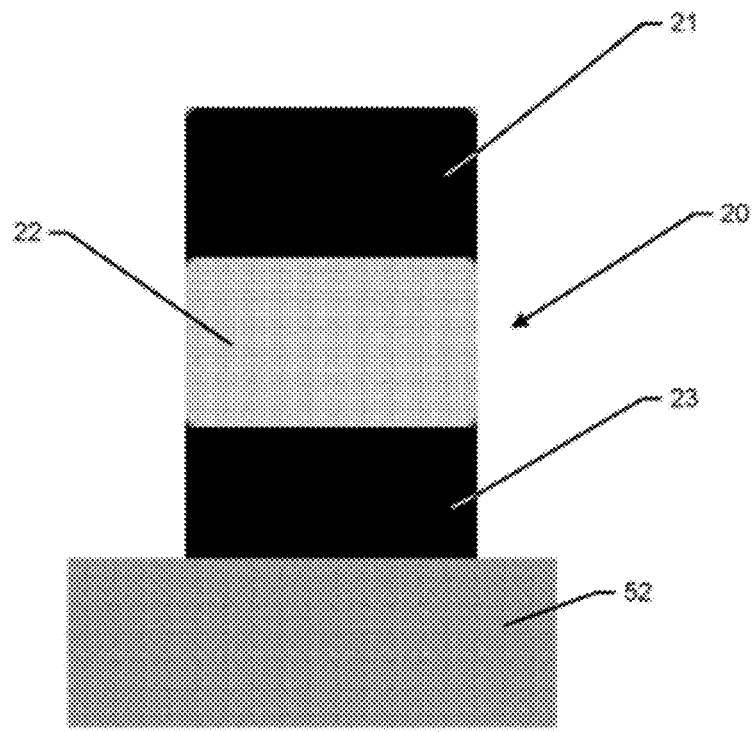
FIGS. 2A through 2H illustrate a cross-section view foldable label at various states of manufacture in accordance with various disclosed aspects.
Figure 3:
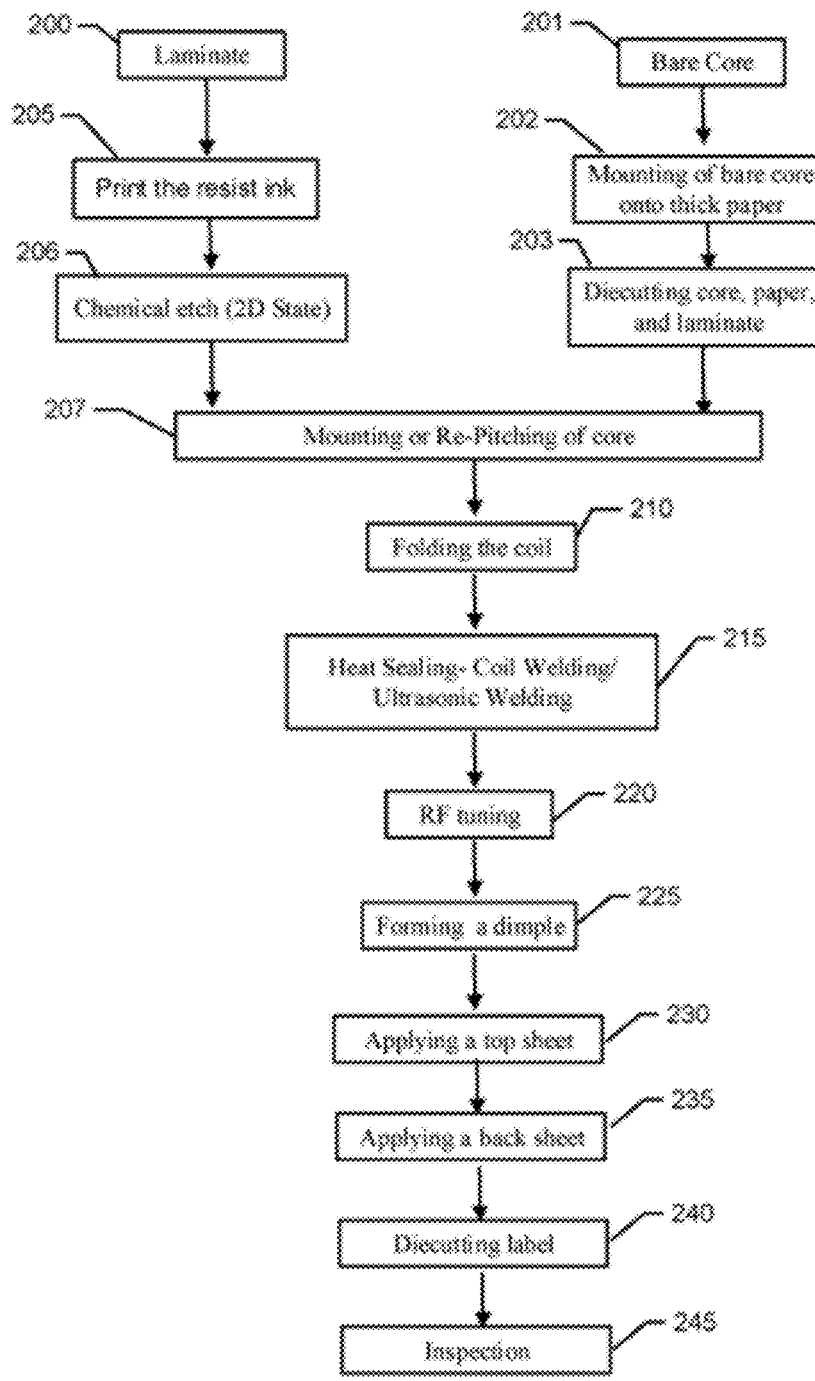
FIG. 3 is flow chart of an example method for making an example foldable label that describes the operations shown in FIGS. 2A through 2H, in accordance with various disclosed aspects.

With reference to FIG. 2A, the core 20 may be constructed, as indicated at 200 of FIG. 3. As previously explained, the core 20 may be constructed of a first ferrite layer 21, a spacer 22, and a second ferrite layer 23. According to some example embodiments, the core 20 may alternatively be formed as a layer of ferrite with a central spacer. Liner 52 may provide a base for the core 20 during construction of the core 20. As described in more detail below, other embodiments may comprise a core without a spacer.

Figure 2B:
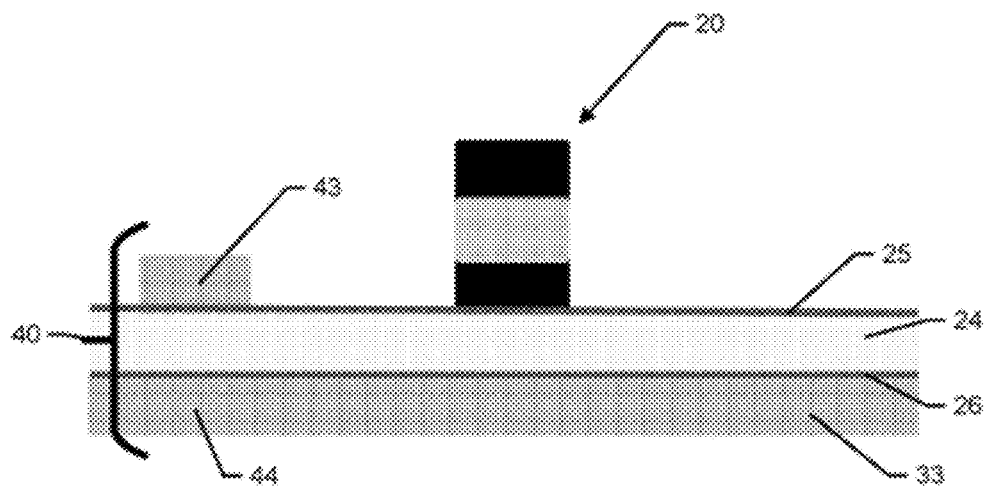

The core 20 may be laminated and the upper capacitor plate 43 may be added as shown in FIG. 2B. In this regard, the core 20 may be laminated to provide additional structural integrity to the core 20. A conductive layer 33, which may have been previously etched with angled traces for forming the turns of the coil 30, may be adhered, via adhesive layer 26, to a dielectric layer 24. The dielectric layer 24 may also have an upper adhesive layer 25 to which the upper capacitor plate 43 may be adhered. Similarly, the upper capacitor plate 43 may have been previously etched in place on the dielectric layer 24. The lower capacitor plate 44 may be a portion of the conductive layer 33. Additionally, the core 20 may be placed on the adhesive layer 25 to adhere the core to the dielectric layer 24.

Figure 2C:
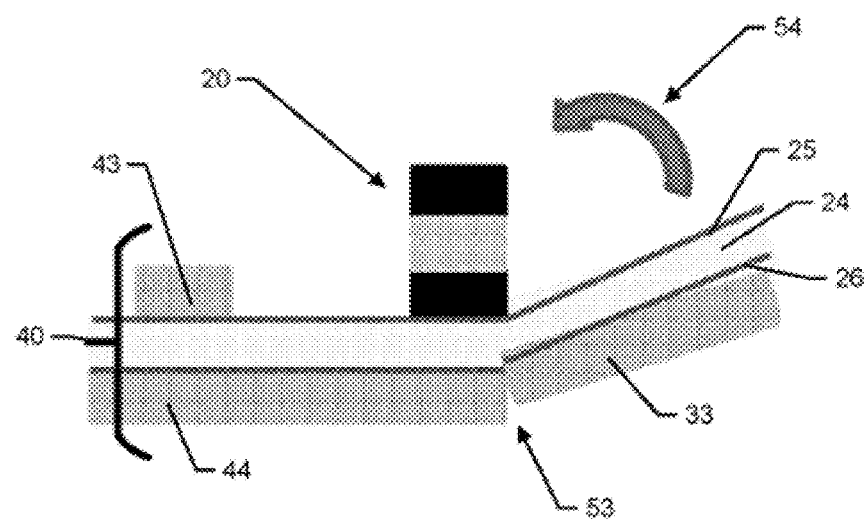

At 210, folding may be performed to form the coil as shown in FIG. 2C. A fold bar, mounting robot technology, or other technique may be used to cause a fold line 54 to form at an edge 53 of the core 20 to wrap the dielectric layer 24 and the conductive layer 33 around the core 20 to facilitate forming the coil 30. Prior to folding, the conductive layer 33 and the dielectric layer 24 may have been die cut to release a portion of the conductive layer 33 and the dielectric layer 24 for folding. The die cutting may be performed in association with register spotting, re-pitching, or the like.

Figure 2D:
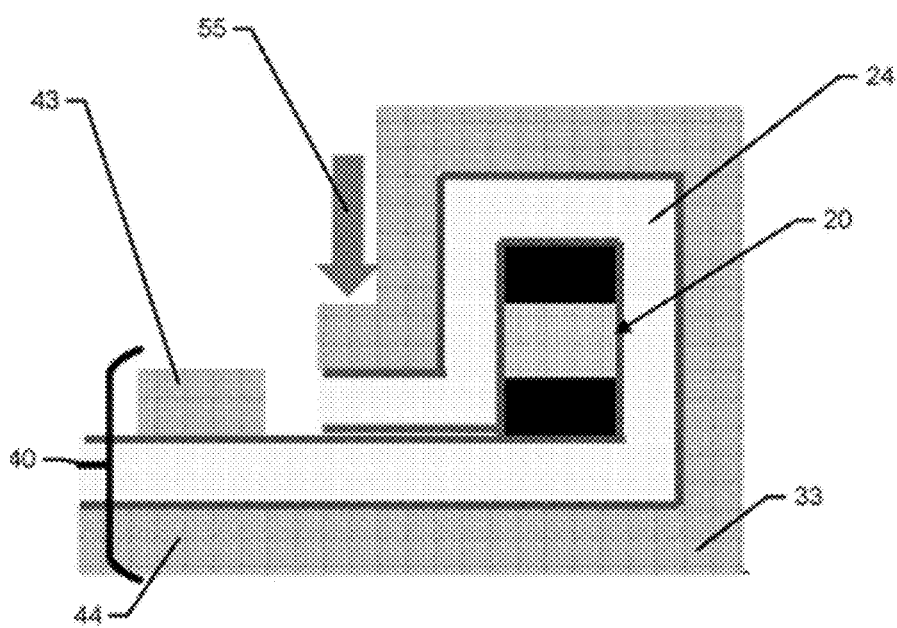
Figure 2E:
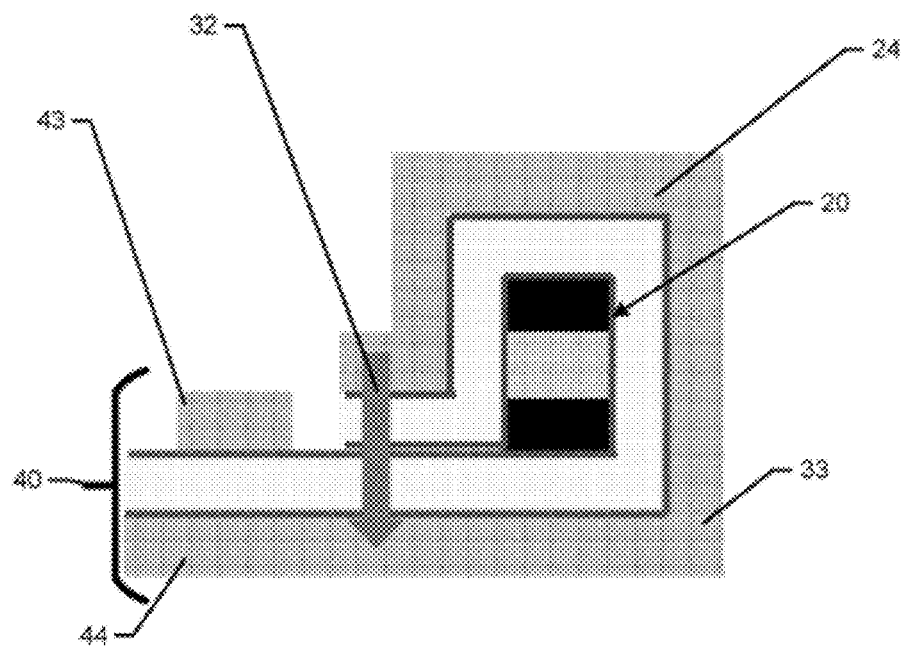

At 215, an ultra-sonic welding process may be performed as shown in FIG. 2D. The welding may be applied at terminal end 55 in preparation for welding to form the turns of the coil 30. The welding may provide temporary adhesion to hold the folded conductive layer 33 and dielectric layer 24 in position in preparation for welding. The coil welding may be performed to connect each turn 31 of the coil 30 in series to form a helical structure for the coil 30, as shown in FIG. 2E. The welding process may be performed at a connection location associated with each turn. In at least some alternative examples, a heat sealing conversion and welding process may be utilized. Welding may involve crimping, crushing, or melting and welding the structure at about position 32 for each turn to electrically and physically connect the wrapped upper portion of conductive layer 33 with the lower portion of conductive layer 33.

Figure 2F:
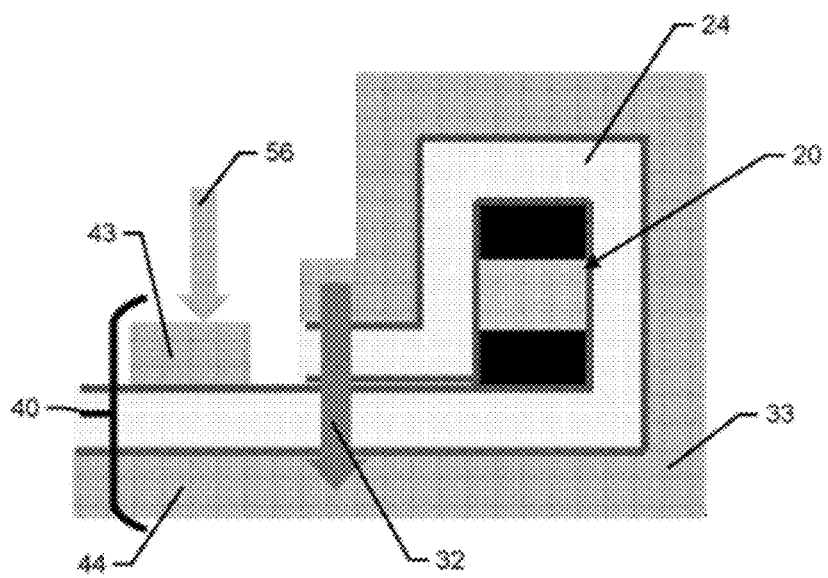
Figure 2G:
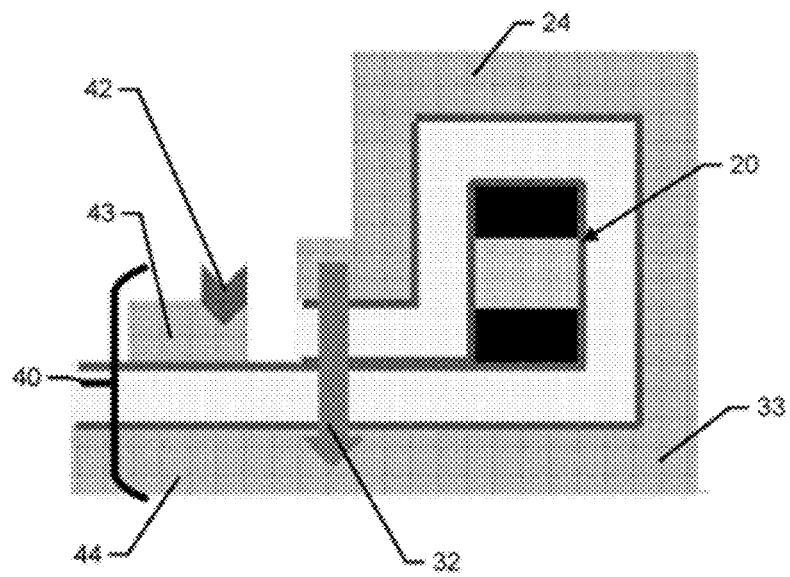

At 220, RF tuning may be optionally performed. It is noted that this RF tuning may be utilized during commercial production of the labels. For example, the RF tuning may be performed by modifying the area of the capacitor plates, as shown in FIG. 2F. RF tuning at about position 56 (e.g., proximal per capacitor plate 43) may be performed using a number of techniques to adjust the capacitance and tune the resonant frequency of the label 10. In this regard, the partially manufactured label may be subjected to an electromagnetic field to determine the resonant frequency of the LC circuit, and RF tuning may be performed to move the resonant frequency to a desired value. To change the resonant frequency, portions of the capacitor plates may be removed to change the capacitance through the removal or modification of the material of the capacitor plates using, for example, a laser.

If the label is deactivatable, then, at 225, a dimple 42 may be created on the capacitor 40. As described above, the dimple 42 may be made in a manner that weakens the dielectric layer 24 in the area of the dimple 42 to permit breakdown of the dielectric when the label is subjected to a relatively high electromagnetic field, thereby deactivating the label.

Figure 2H:
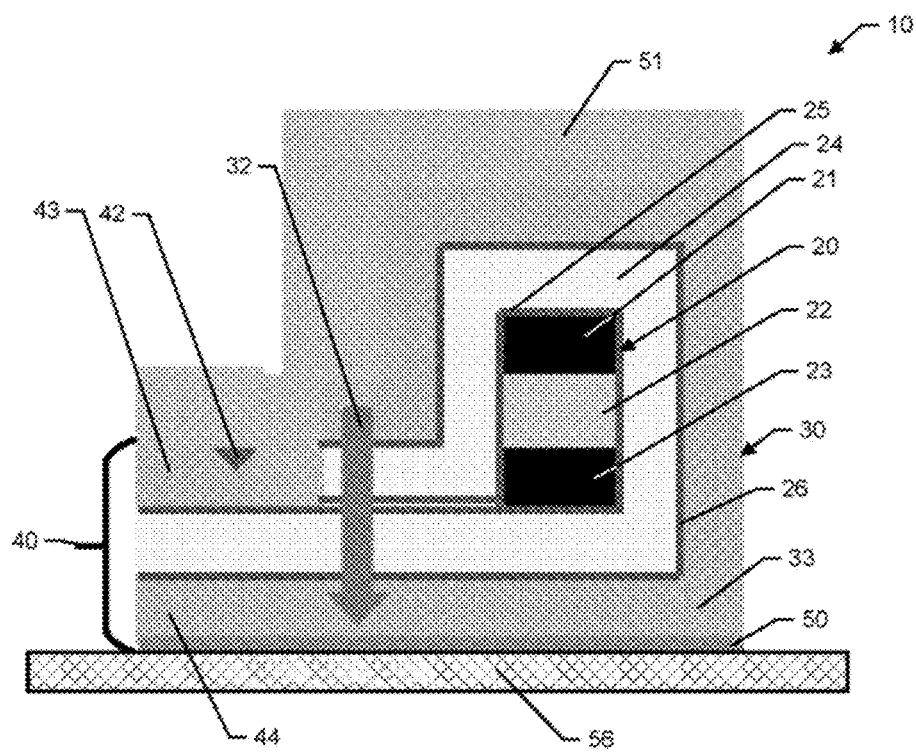

At 230, a top sheet 51 may be applied to the upper surface of the conductive layer 33, as shown in FIG. 2H. The top sheet 51 may be formed of, for example, paper to give the label 10 a clean and aesthetically pleasing look. The top sheet 51 may also operate to protect the features of the LC circuit (i.e., the capacitor 40, the coil 30, etc.) that may be accessible in the absence of the top sheet 51. A product attach adhesive layer 50 may also be added on a liner or lower surface of the conductive layer 33 that is used to affix the label 10 to a product. Further, the label 10 may be placed on a liner 56 of, for example a roll or a sheet, for packaging or shipping. The liner 56 may operate to protect the product attach adhesive layer 50 until the label 10 is ready to be applied to a product. This folded coil label can also provide a longer clear top sheet laminated due to extended pitch by folding at a repeat direction, which is helpful to create an enhanced tamper label for higher security level.

At 235, a back sheet may be applied and at 240, die cutting of the label may be performed. At 245, an inspection may be performed to test the label. The inspection may be done by a user, an automated process, or a combination of a user and automated machine. For instance, inspection of the resonant frequency may be performed by a manufacturer prior to shipping to a customer. It is noted that a number of sample labels may be tested from a larger set or batch of labels.

FIGS. 4A-4E will now be described, which illustrate the operations of forming a folded coil label from an overhead view according to some example embodiments. It is noted that the various views depicted in FIGS. 4A-4E may correspond to method 250 of FIG. 3. Moreover, it is noted that like named components of FIGS. 4A-4E and the other figures may comprise similar aspects.

Figure 4A:
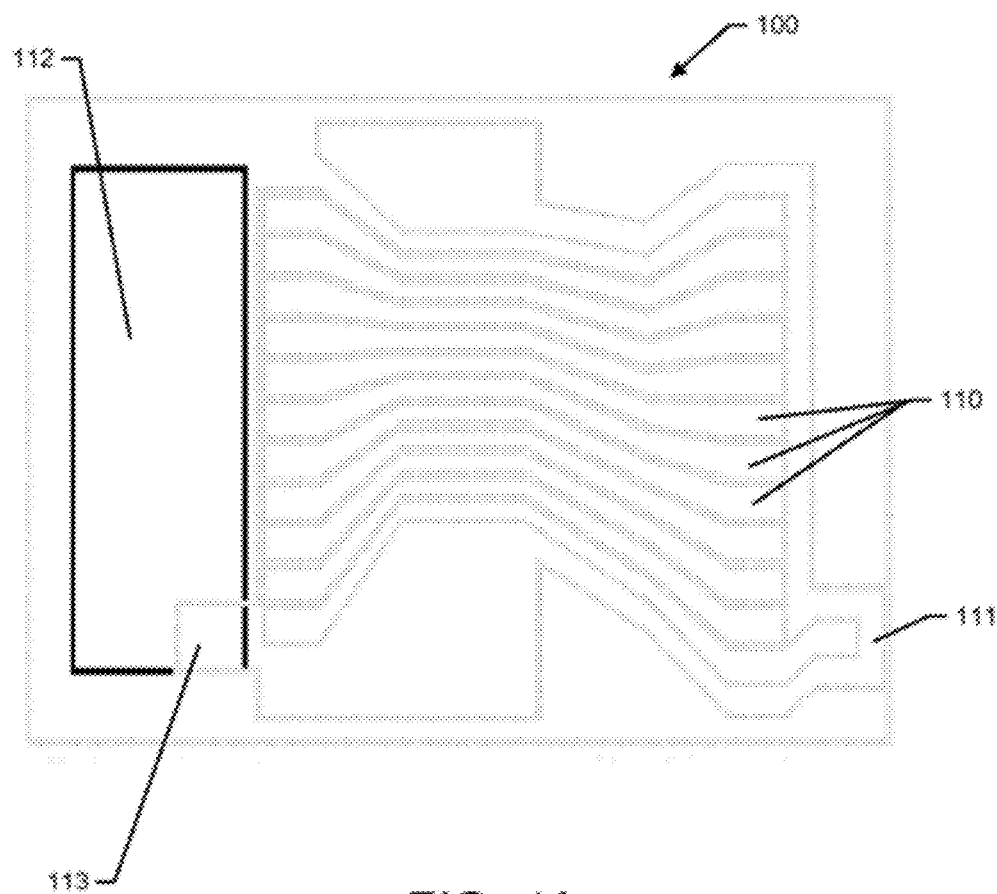
FIGS. 4A through 4E illustrate top views of a foldable label at various states of manufacture according to some example embodiments.

In FIG. 4A, an etched aluminum conductive layer is shown having traces 110, which become turns of a coil when the traces 110 are wrapped around a core to form an angled coil. The angles may allow for off-set areas between a ferrite core material and coil traces 110. It is noted that the orientation of the angles of traces 110 may be modified. As can be seen in FIG. 4A, the traces 110 are angled such that the ends of the traces 110 align with the adjacent traces 110 to form the coil when the traces 110 are folded. The pad 111 may be positioned to align with pad 113 for the capacitor 112 when the fold is performed for connecting one end of the coil to the capacitor 112. Pad 113 may also be positioned to engage with a pad for connecting to the capacitor on the other capacitor plate. The capacitor 112 and the traces 110 may be constructed during a resist ink printing and etching operations.

Figure 4B:
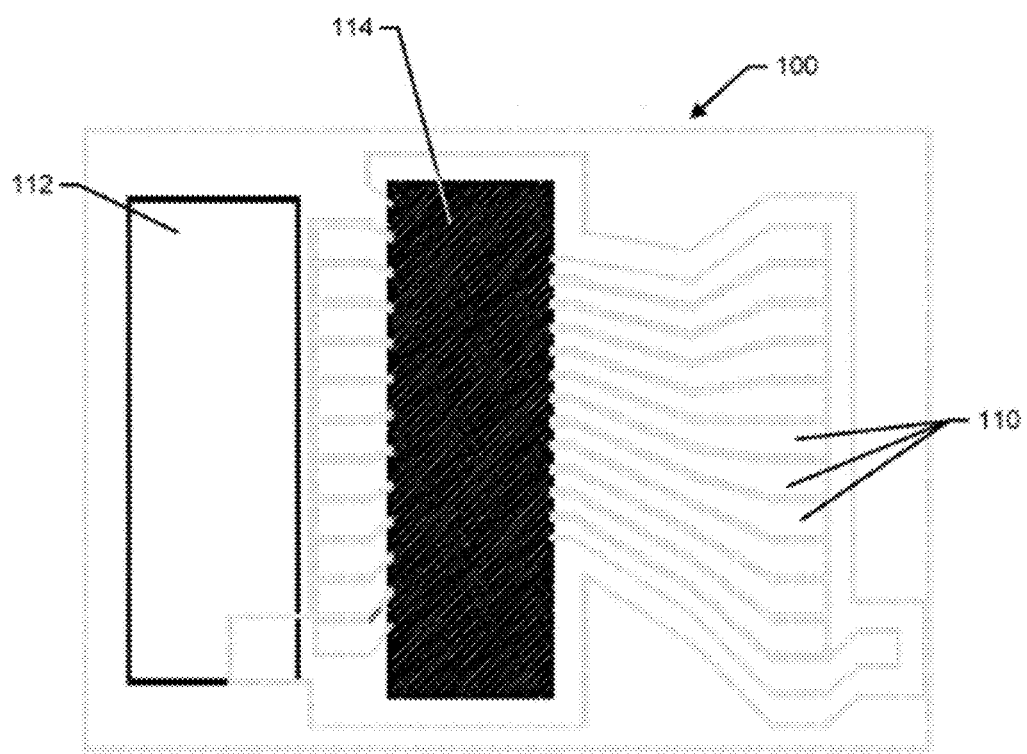
Figure 4C:
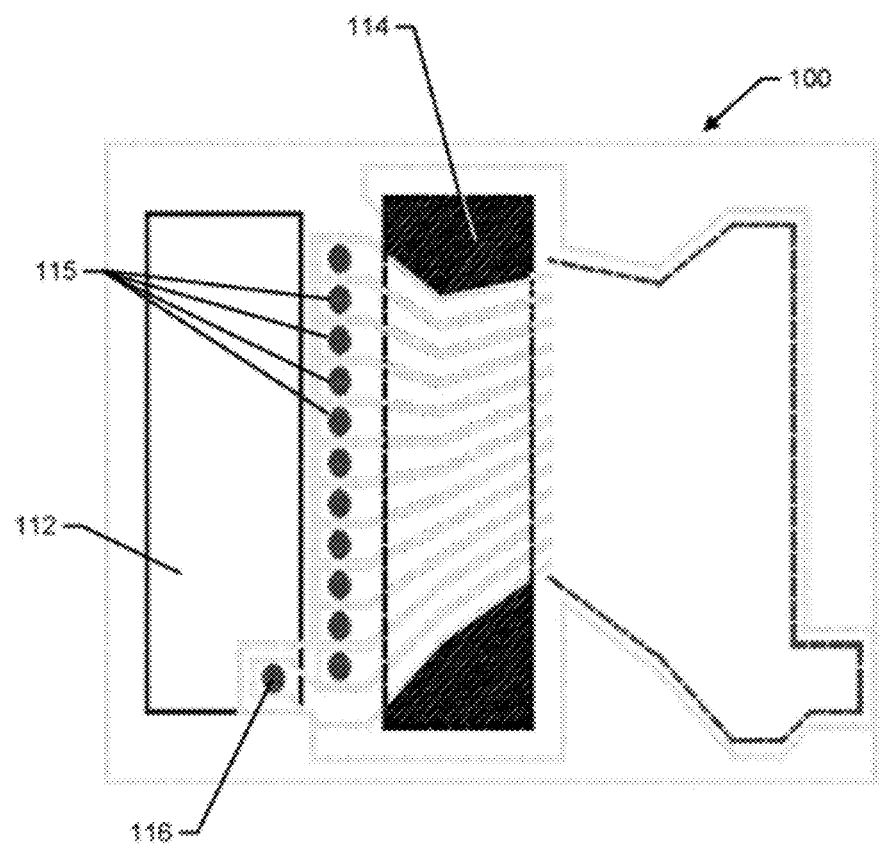
Figure 4D:
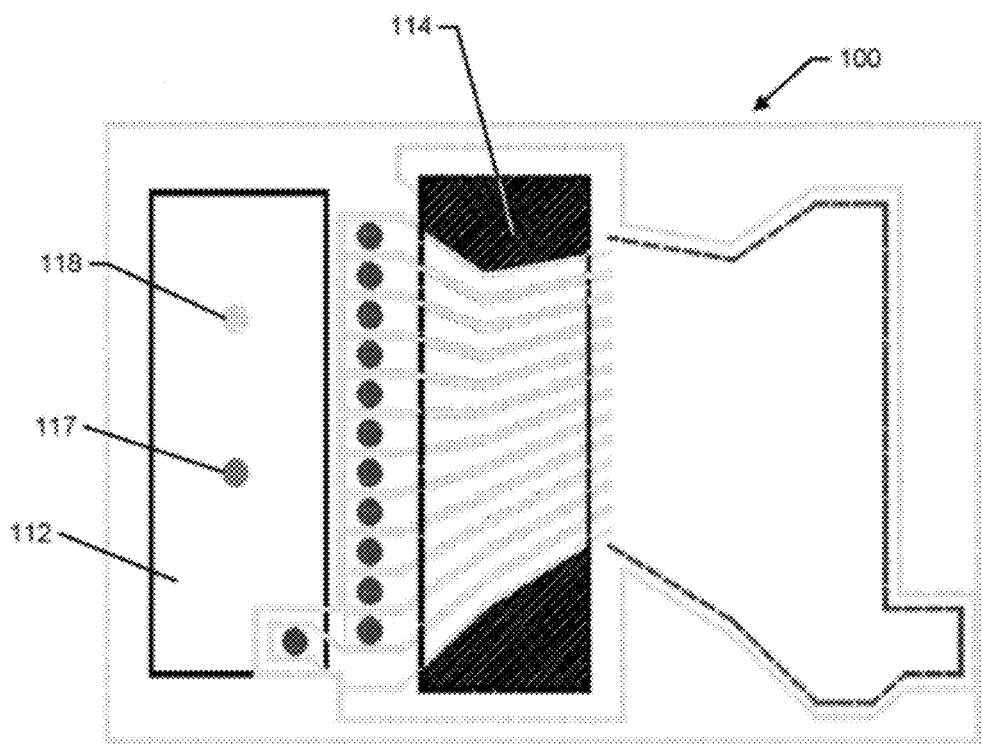
Figure 4E:
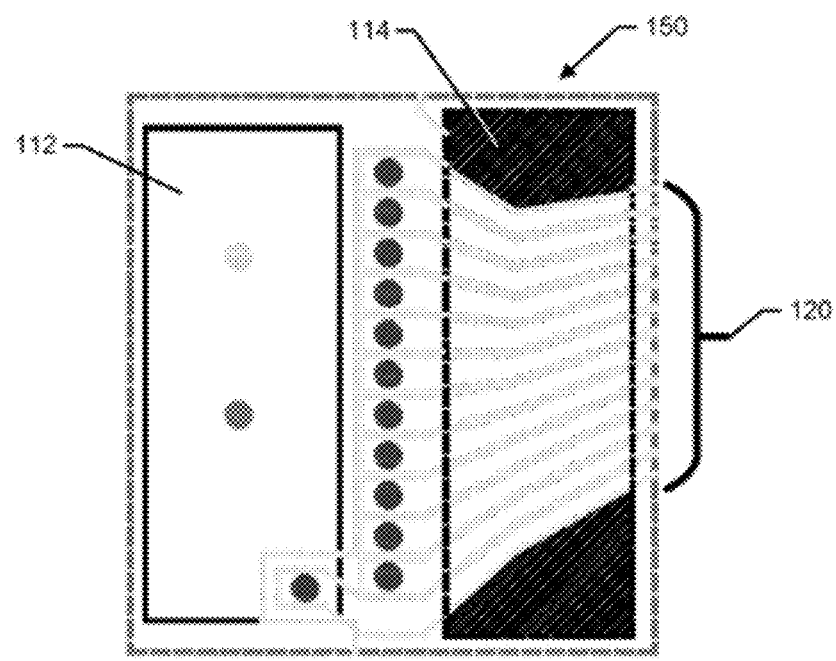

Referring now to FIG. 4B, a core 114 (e.g., the same or similar to the core 20) is located beneath the traces 110. At FIG. 4C, the traces 110 have been die cut along their edge and the traces 110 have been folded up and over the core 114. Welds 115 may be made to connect the traces 110 to form turns (e.g., turns 31) of a coil (e.g., coil 30). Weld 116 may be made to connect the coil to the capacitor 112. At FIG. 4D, RF tuning may be performed on the capacitor 112 at location 118 and a dimple 117 may be added to the capacitor 112. At FIG. 4E, the remaining conductive layer and dielectric layer may be cut away by another die cut to form the label 150. As shown in FIG. 4E, the coil 120 may be formed by connections between the traces 110, which form turns of the coil 120.

Figure 5A:
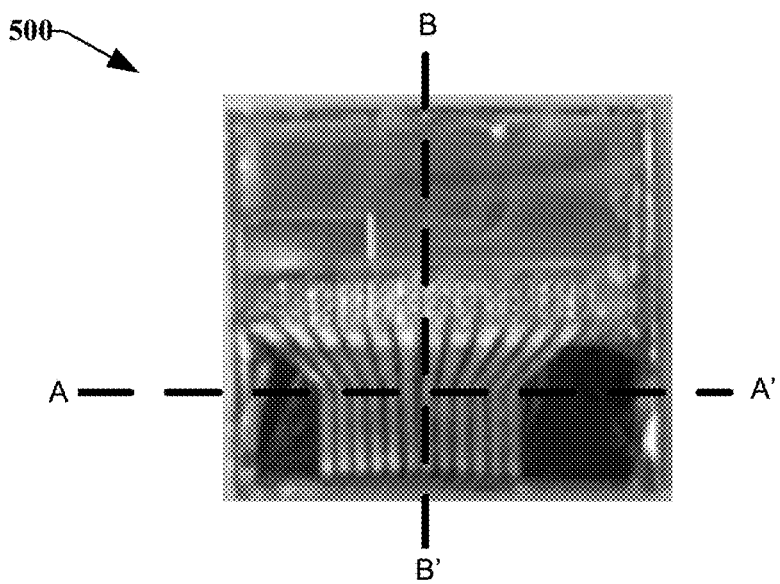
FIGS. 5A through 5C illustrate a foldable label with a metal insert layer from a top view, a cross-sectional view along line B-B', and a cross-sectional view along line A-A', respectively, in accordance with various disclosed aspects.
Figure 5B:
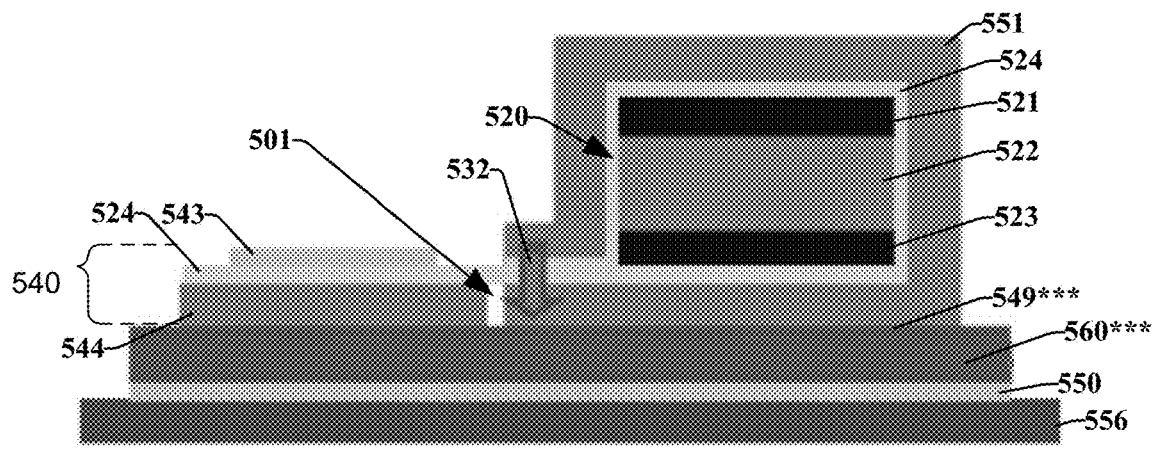
Figure 5C:
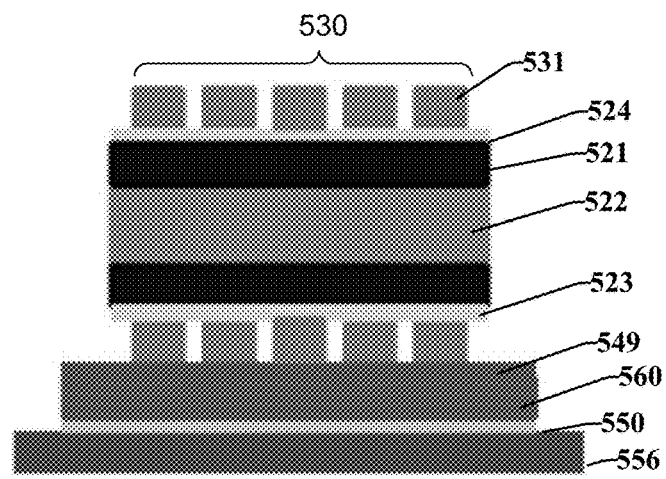

Turning now to FIGS. 5A-5C, a foldable label 500 comprising a metal layer disposed between a coil and liner. It is noted that like named components of foldable label 500 and various other disclosed labels (e.g., label 10, etc.) may comprise similar aspects. The metal layer may comprise an aluminum foil that may comprise a frequency compensator that may boost detection performance of a detectable folded coil. As described herein, the thickness of the metal layer may be between 40-80 microns.

Foldable label 500 may comprise a ferrite core 520 comprising a first ferrite layer 21 and a second ferrite layer 23 spaced apart from each other by a spacer 522. The spacer 522 may comprise a non-ferrous or conductive material. A dielectric layer 524 may envelope all or a portion of the ferrite core 520. A sheet 551 may envelope all or a portion of the dielectric layer 524 or ferrite core 520. The sheet 551 may comprise a relative thick aluminum forming a coil 530. The coil 530 may include a number of rungs or turns 531. As described here as well as elsewhere in this disclosure, the turns 531 may be connected to adjacent turns in series by, for example, crimping or welding, such as through welds 532.

A capacitor 540 may be disposed proximal the coil 530. For instance, the capacitor 540 may be formed next to the coil 530 on a back film 549 and may be separated by a space 501. The dielectric layer 524 may be disposed between a top plate 543 of the capacitor 540 and a bottom plate of the capacitor 544. The top plate 543 and bottom plate 544 may comprise a metal layer, such as an aluminum layer. In an example, the top plate 543 may comprise a layer of aluminum or other metal that is generally thinner than the bottom plate 544. In some embodiments, the bottom plate 544 may comprise a similar thickness as the sheet 551.

A metal layer 560, such as an aluminum layer, may be disposed underneath the coil 530 and capacitor 540, such as beneath the back film 549. The metal layer 560 is then adhered to a liner 556 with an adhesive or hotmelt 550. It is noted that the metal layer 560 may increase the ability of foldable label 500 to be detected in accordance with various embodiments.

Figure 6A:
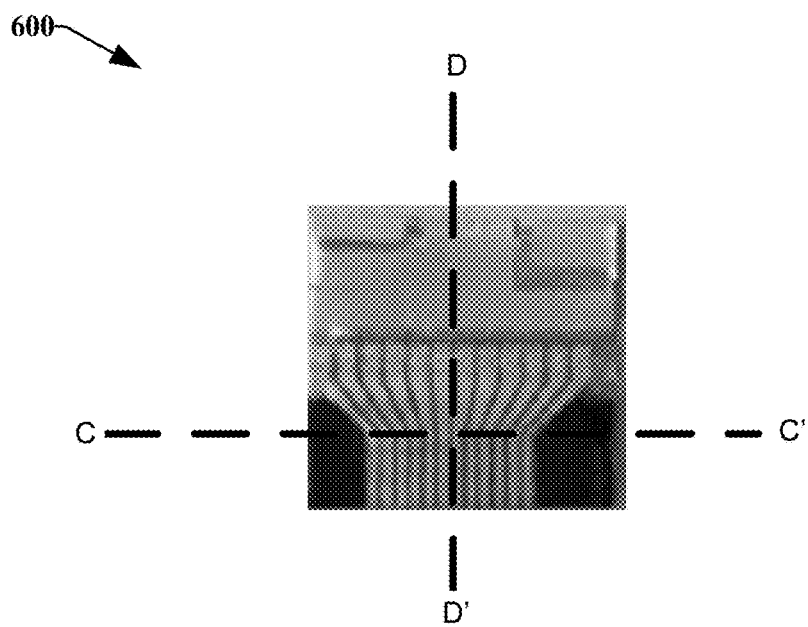
FIGS. 6A through 6C illustrate a foldable label without a metal insert layer from a top view, a cross-sectional view along line D-D', and a cross-sectional view along line C-C', respectively, in accordance with various disclosed aspects.
Figure 6B:
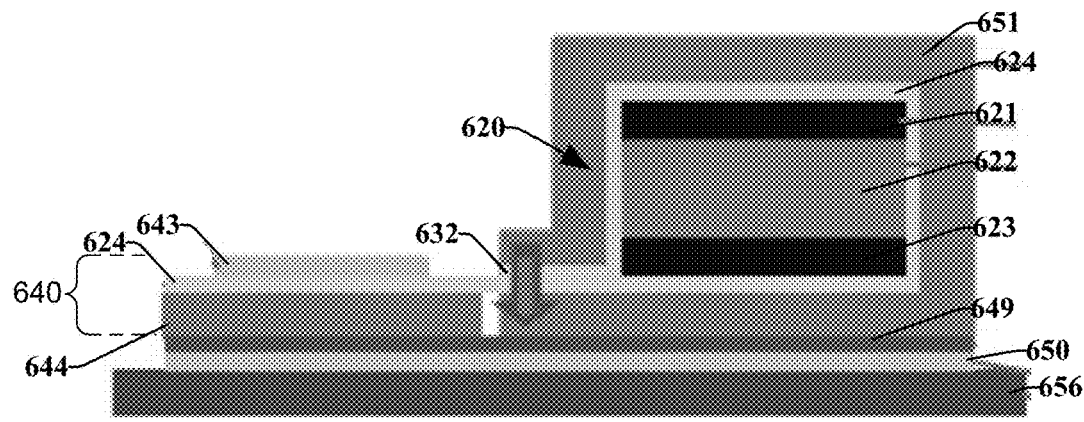
Figure 6C:
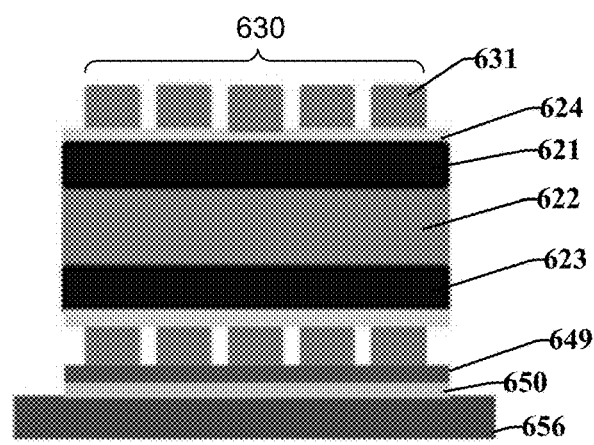

For instance, FIGS. 6A-6C illustrate a foldable label 600 having similar aspects to foldable layer 500, except for metal layer 560. It is noted that like named components of foldable label 600 and various other disclosed labels (e.g., foldable label 10, 500, etc.) may comprise similar aspects. The foldable label 600 may generally include a ferrite core 20 comprising a first or top ferrite layer 621 and a second or bottom ferrite layer 623. A spacer 622 may be disposed between the top ferrite layer 621 and bottom ferrite layer 623. The core may be wrapped by a dielectric layer 24. A metal layer 651 may form a coil 630 having turns 631 around the ferrite core 620 and dielectric layer 624. Welds 623 may couple the turns 631 together to form a helical coil. A capacitor 640 is formed adjacent to the coil 630 on a back film 649. The back film 649 may be adhered to a liner 656 via an adhesive, such as a hotmelt 650.

The capacitor 640 may comprise a top plate 643 and a bottom plate 644 disposed on either side of the dielectric layer 624. The capacitor 640 and coil 630 may form an LC circuit/antenna that is tuned to resonant at a particular frequency such as about 8.2 MHz with some variance e.g., +/−5%. The foldable label 600 may be adhered to a product, such as a metal product, and may be detectable by an EAS device. By resonating in the field, the foldable label 600 may be excited by a signal emitted by an EAS device at the particular frequency so that it may be detected by an antenna. As such, the foldable label 600 triggers an alarm to sound due to an apparent theft event.

Figure 7A:
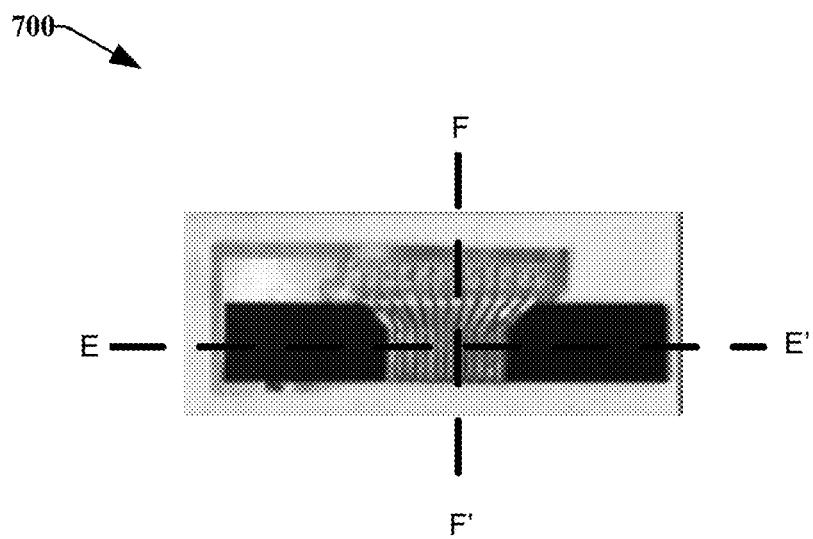
FIGS. 7A through 7C illustrate a foldable label with a capacitor beneath a coil from a top view, a cross-sectional view along line F-F', and a cross-sectional view along line E-E', respectively, in accordance with various disclosed aspects.
Figure 7B:
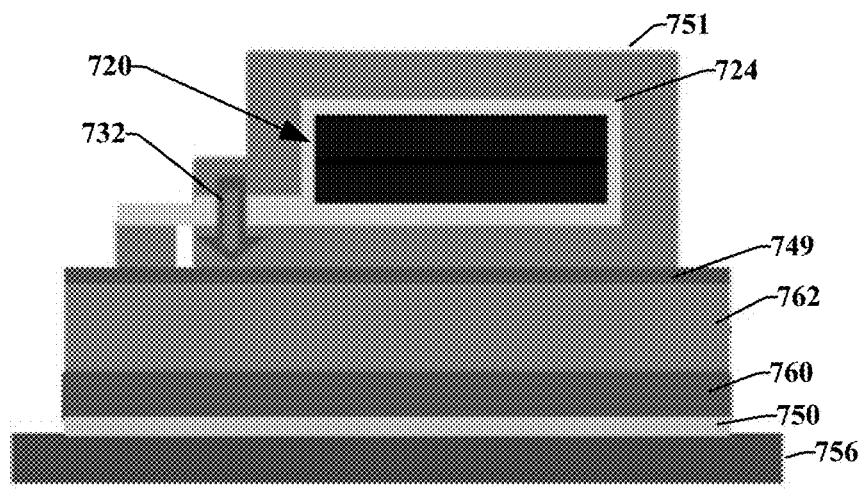
Figure 7C:
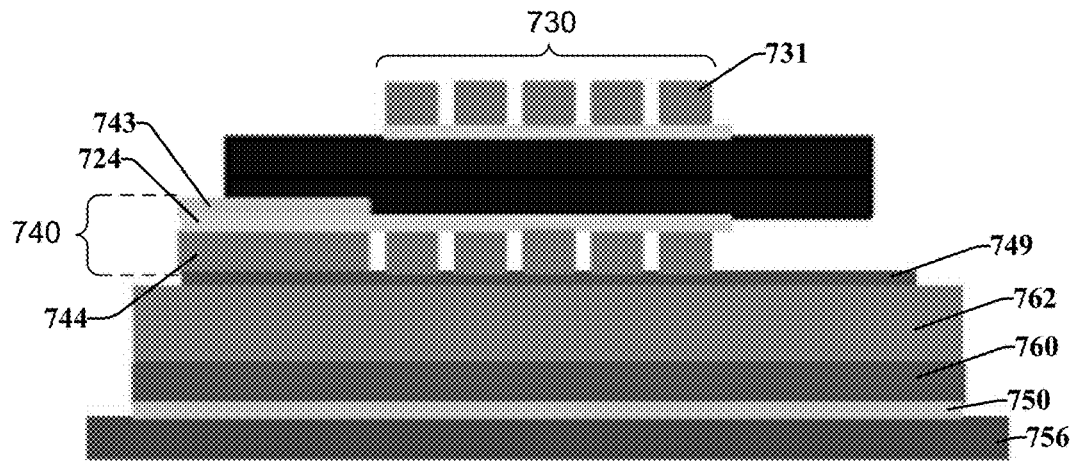

FIGS. 7A-7C illustrate a foldable label 700 comprising a ferrite core that is extended, in comparison to some other disclosed embodiments, and a capacitor plate located underneath the ferrite core. It is noted that like named components of foldable label 700 and various other disclosed labels (e.g., foldable label 10, 500, 600 etc.) may comprise similar aspects In an aspect the foldable label 700 may minimize or reduce the length of the repeat direction even when a spacer and metal layer are disposed underneath a coil and capacitor.

The coil 730 may be formed of turns 731 (which may be welded together at welds 732) that define a metal layer 751 of the foldable label 700. A ferrite core 720 is disposed within a dielectric layer 724 and the metal layer 751. As described herein, the capacitor 740 may be disposed generally beneath the ferrite core 720. For instance, a top plate 743 of the capacitor 740 may be disposed underneath or at a bottom of the ferrite core 720. The top plate 743 is disposed above a portion of the dielectric layer 724 and the bottom plate 744. As such, the capacitor 740 and coil 720 may form an LC circuit. The LC circuit may be disposed on a back film 749. The back film 749 may be attached to a bottom spacer 762. A metal layer 760 (e.g., aluminum layer) may be disposed beneath the spacer 749. The metal layer 760 may be adhered to a liner 756 via a hotmelt 750 or other adhesive.

The spacer 762 provides a greater distance of separation of the coil 730 or core 720 from a metal surface, such as the metal layer 760 or a metal product. In an aspect, the thickness of the spacer 762 may be selected based on cost, function, or both cost and function. In examples, the spacer may comprise a synthetic paper having a mass per unit area of between about 160 to 500 g/m$^2$ (such as 160-300, or 300-500 g/m$^2$). It is noted that the specifications of the spacer 762 and arrangement of the other components of the foldable label 700 may be selected to allow for an improved detectable label when adhered to a metal item.

FIGS. 8A and 8B illustrate a comparison between a disclosed EAS label 800 and a prior art label 82. Both labels are attached to the same product 84. The product 84 comprises an electrically conductive material (e.g., can, box, laminated or coated package, etc.). As shown, the prior art label 82 of FIG. 8B includes a flux direction 86 that is generally perpendicular to the conductive surface of the product 84, which will generate eddy current on the conductive surface. Then, the EAS label will not be able to resonate, or cause alarm when it passes through the detection gates.

As shown in FIG. 8A, an exemplary embodiment of the disclosed EAS label 800 includes a flux direction 806 that is generally parallel to the conductive surface 88 of the product 84. It is noted that the product 84 is not limited to a particular shape. As such, EAS labels of the present embodiment do not need to be placed on planar surfaces. As such, reference to flux directions that are generally parallel to a conductive surface includes flux directions that are within 10 degrees of parallel to a tangent of a curved surface, a planar surface, or the like.

Figure 9A:
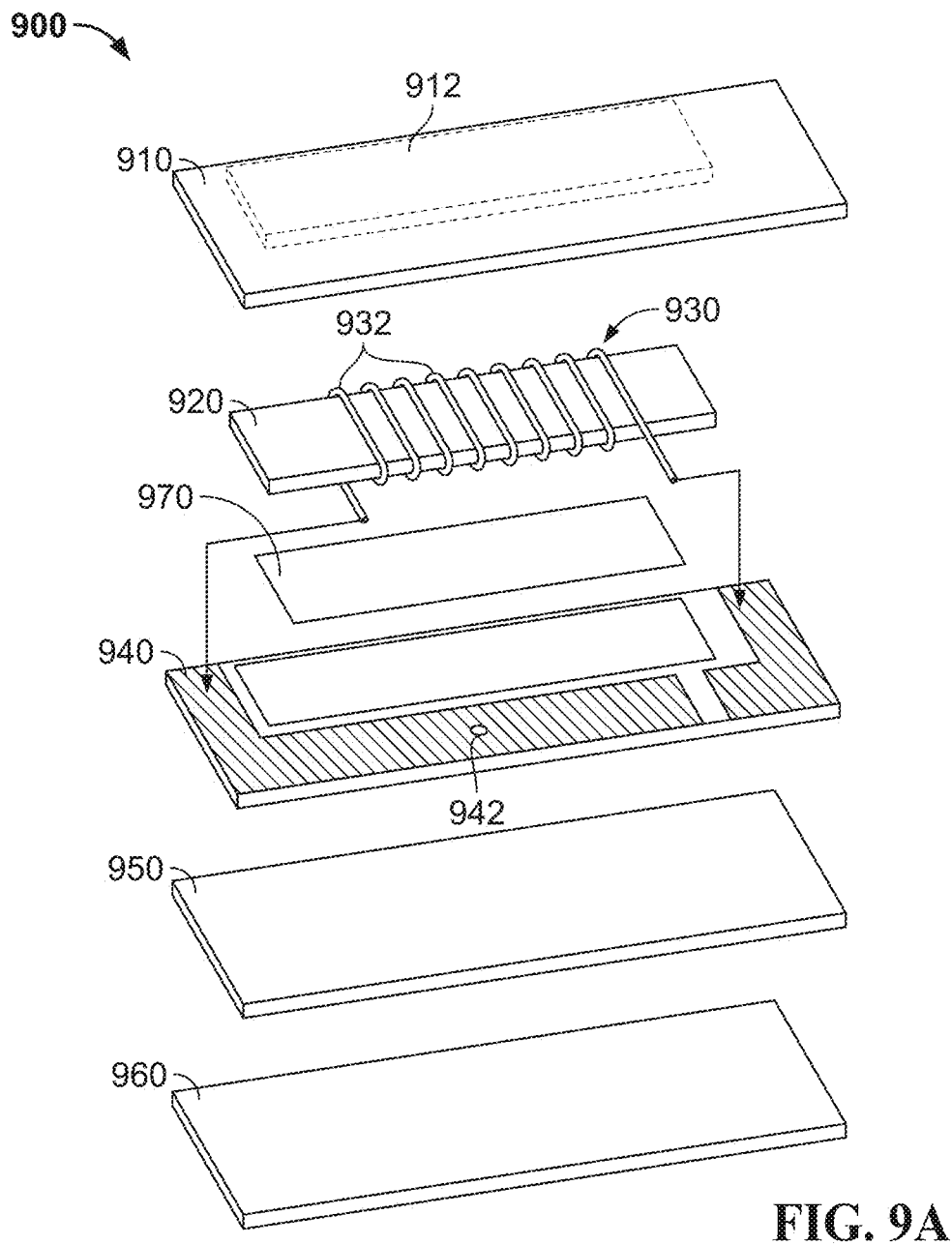
FIG. 9A illustrates an exploded view of an EAS label including a ferrite coil in accordance with various disclosed aspects.

Referring now to FIG. 9A, there is an exploded view of an EAS label 900 in accordance with various disclosed embodiments. The EAS label 900 may generally include a coil 930 coupled to a capacitor 940. It is noted that the EAS label 900 may include one or more of a housing 910, ferrite core 920, a spacer 950, a shield 960, and an insulator 970, such as a BOPP or PET film.

The coil 930 may be formed of a conductive material (e.g., copper, or the like) and may be comprised of any number of turns 932. The turns 932 of the coil 930 may be in a helical structure. It is noted that the turns may be wrapped around a material, such as the ferrite core 920, with each end of the coil 930 being connected to a respective plate of the capacitor 940. Attachment to the capacitor 940 may be done through welding (e.g., crimping, conducting glue, and soldering) or the like to a lead, landing, or pad connected to the capacitor plate.

Figure 9B:
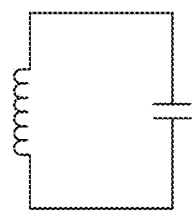
FIG. 9B illustrates a resonate circuit in accordance with various disclosed aspects.

By connecting the capacitor 940 to the coil 930, an inductor-capacitor or LC circuit may be formed, such as shown in FIG. 9B. The inductance of the coil 930 and the capacitance of the capacitor 940 may be selected to form a circuit that resonates in an electromagnetic field of a particular frequency, such as, for example, 8.2 MHz. By resonating in the field, the circuit and the label 900 may return an RF signal when excited. The returned RF signal may be detected by an antenna, such as an antenna of a receiver device located at an exit of a retailer's facility, POS, or other location. As such, the label 900 may be employed as an EAS label, and for example, trigger an alarm to sound, alert an administrator, or otherwise trigger an event due to an apparent theft event of a product affixed to the label 900.

To tune the LC circuit for a particular frequency of operation, the structure of the capacitor 940 may be modified. In this regard, the area of the capacitor plates may be modified, for example via removal of material from the plates using, for example, a laser or using a mechanical technique. A portion of the capacitor 940 area may be allocated for tuning. For instance, some of the capacitor plate material may be removed to tune the circuit. It is noted, however, that some embodiments may comprise tighter or less variance in frequency of labels and may not require such tuning.

When the label 900 is used as a non-reusable product security device, the label 900 may require a means for deactivating the label 900 and the LC circuit. In this regard, deactivation typically involves changing the circuit or destroying the circuit's characteristics in such a way that either changes the resonant frequency from a target frequency so that the label 900 can no longer be detected by EAS antennas, or simply eliminate the circuit's ability to resonate at any frequency by destroying the dielectric layer between the plates of the capacitor 940. Such as through a short circuit. It is noted that the capacitor may include a capacitor made from aluminum-film-aluminum laminate (by etching or die cut), a deactivatable chip capacitor, or any other type of capacitor.

In an example, the capacitor 940 may comprise a top plate and a bottom plate disposed on either side of a dielectric layer. As noted above, the capacitor 940 and coil 930 may form an LC circuit/antenna that is tuned to resonate at a particular frequency such as about 8.2 MHz with some variance e.g., +/-5%. The EAS label 900 may be adhered to a product, such as a metal product, and may be detectable by an EAS device. By resonating in the field, the EAS label 900 may be excited by a signal emitted by an EAS device at the particular frequency so that it may be detected by an antenna. As such, the EAS label 900 triggers an event due to an apparent theft event.

In some embodiments, to facilitate destruction of the dielectric layer between the plates of the capacitor 940, a dimple 942 may be formed on the capacitor 940. The dimple 242 may be formed by creating a weak point in the dielectric (e.g., by a controlled crimp) that allows the capacitor 940 to continue to operate normally until the label 900 is subjected to a relatively high electromagnetic field which causes the dielectric to permanently break down at the dimple 942 location, thereby deactivating the label 900.

In another aspect, the ferrite core 920 may be formed of any type of ferrous material, which may be a non-flexible or flexible ferrous material such as a soft ferrite material (e.g., temporarily magnetized material). In some embodiments, the coil 930 may be elongated such that the ferrite core 920 may be removed or otherwise not included without degradation of performance. In other embodiments, the ferrite core 920 may be included to enhance or improve the coil inductance.

The spacer 950 may be formed of any non-ferrous or conducive material. In some example embodiments, the spacer 950 may be a non-flexible or flexible member. In this regard, the spacer 950 may be formed of paper, plastic, or the like. In at least some embodiments, the housing 910 may be provided to protect operative elements, for aesthetic purposes or to include indicia, such as logos or text. The housing may comprise paper, plastic, or other material. It is noted that the housing 910 may be configured to receive indicia, such as configured for receiving ink from an Inkjet printer or the like. The size of the housing is generally not limited except to the extent that it would have a size or footprint suitable for use on an intended product. Thus, the tag or label size can be relatively large if used on larger products, but can also be relatively small for other applications. In one embodiment, the housing 910 can have dimensions of about 40 mm×30 mm. In other embodiments, housing 910 may comprise a generally small footprint compared to other tags, such as a footprint of a size smaller than about 15 mm×20 mm, 20 mm×25 mm, or the like.

In an aspect, the housing 910 may include a cavity that receives some or all other portions of the EAS label 900. For instance, the cavity 912 may receive the coil 930, core 920, insulator 970, capacitor 940, spacer 950, or shield 960. In at least some embodiments, the cavity 912 receives the coil 930 and/or core 920. The housing 910 may then be attached (e.g., adhered, or otherwise coupled to) one or more of the capacitor 940, insulator 970, spacer 950, or shield 960.

The shield 960 may comprise a non-ferrous material (e.g., aluminum, etc.) that may shield the LC circuit formed by the coil 930 and the capacitor 940 from interference by a conductive product surface (e.g., surface 8). It is noted that the shield 960 may comprise or receive an adhesive to allow the EAS label 800 to be attached to a releasable liner, a product, or the like.

Figure 10:
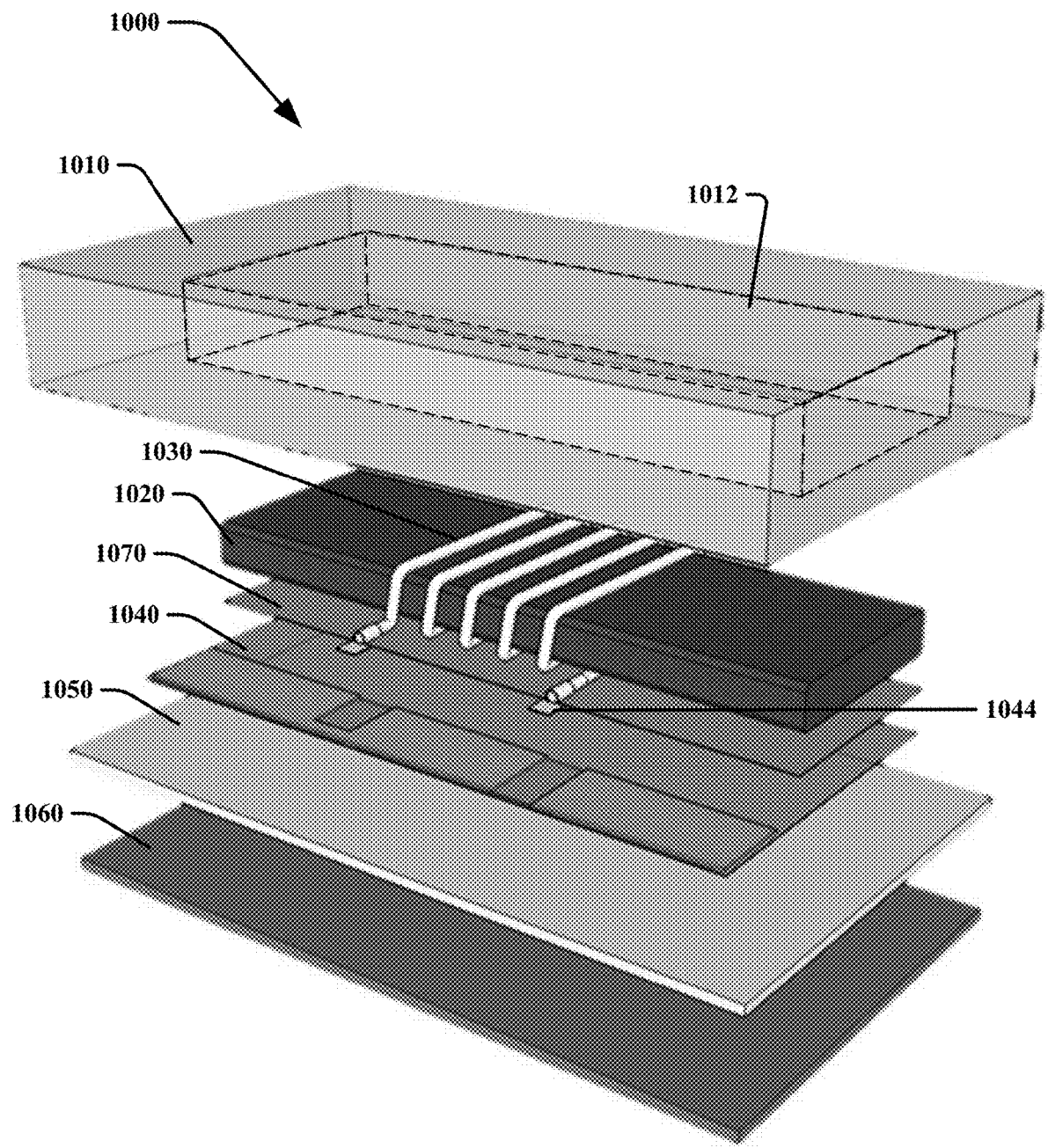
FIG. 10 illustrates an exploded view of another EAS label including a ferrite coil in accordance with various disclosed aspects.

Turning to FIG. 10, there is an exploded view of an EAS label 1000 in accordance with various disclosed embodiments. The EAS label 1000 may include the same or similar aspects as EAS label 900. It is noted that like named parts may include similar aspects. EAS label 1000 generally includes a coil 1030 coupled to a capacitor 1040, a housing 1010, ferrite core 1020, a spacer 1050, a shield 1060, and an insulator 370, such as a BOPP or PET film. The coil 1030 may be connected to plates 1044 of the capacitor 1040. The housing 1010 may include a recess or cavity 1012 that receives some or all other portions of the EAS label 1000, such as the coil 1030, core 1020, insulator 1070, capacitor 1040, spacer 1050, or shield 1060.

Figure 11:
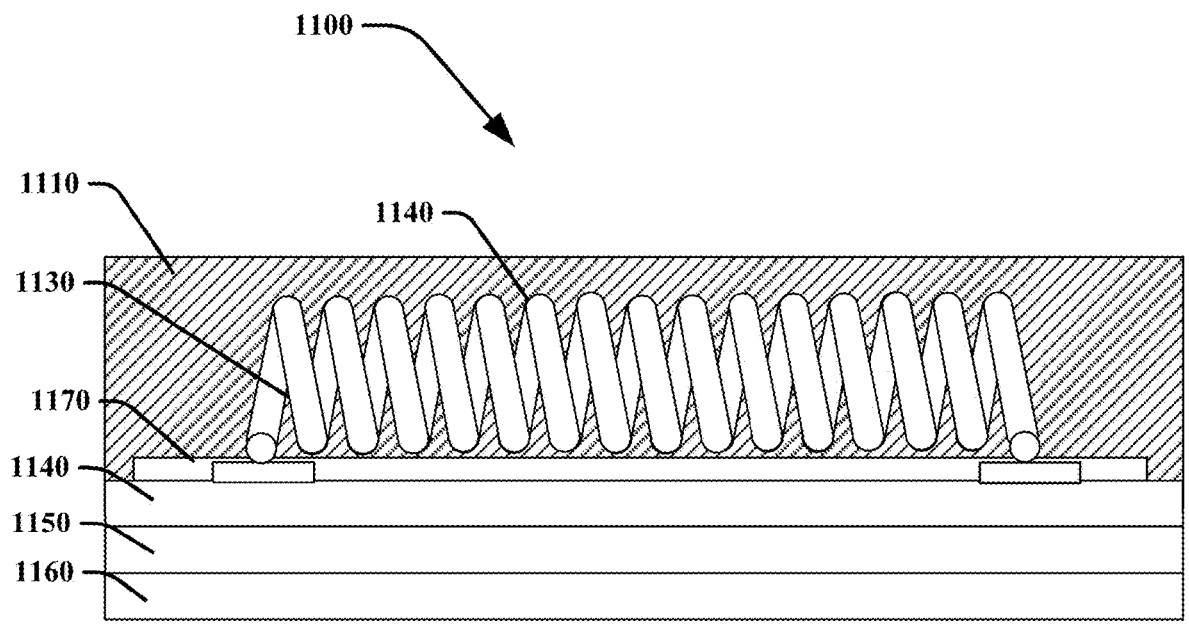
FIG. 11 illustrates a partial cross-sectional view of an EAS label in accordance with various disclosed aspects.

FIG. 11 illustrates a cross-sectional view of an EAS label 1100 in accordance with various disclosed embodiments. The EAS label 1100 may include the same or similar aspects as EAS labels 900 and 1000. It is noted that like named parts may include similar aspects. EAS label 1100 generally includes a coil 1130 coupled to a capacitor 1140, a housing 1110, a spacer 1150, a shield 1160, and an insulator 1170, such as a BOPP or PET film. As shown, the EAS label 1100 does not include a ferrite core. It is noted that the coil 1130 may be formed around another material or may be free of material. In some embodiments, the housing 1110 may be shaped to receive or shaped around the coil 1130. It is noted that the sizes and thicknesses of the various components may be selected as appropriate.

Figure 12:
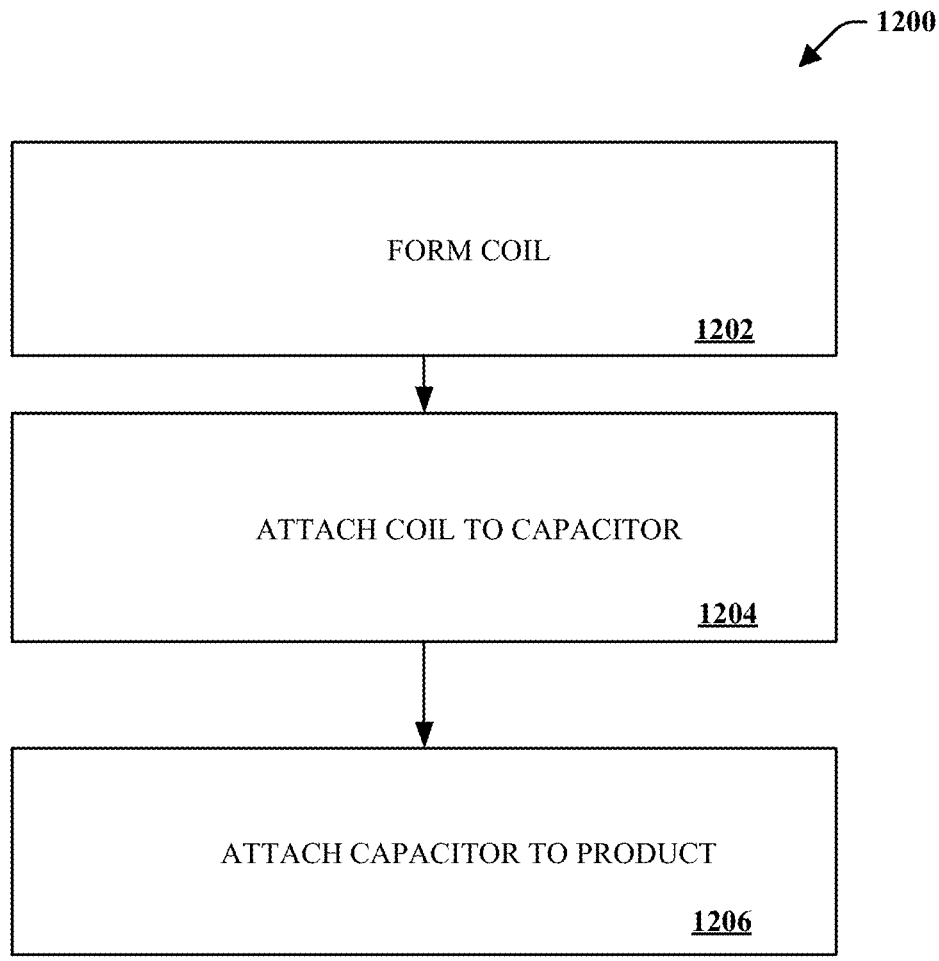
FIG. 12 is a flow chart of an example method for making an example EAS label, in accordance with various disclosed aspects.

In view of the subject matter and views in FIGS. 8A, 9A, 9B, 10, and 11, a method that may be related to various embodiments may be better appreciated with reference to the flowchart of FIG. 12. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

At 1202, a coil may be formed. The coil may be formed of a copper wire or the like. In some embodiments, the coil may be formed around a ferrite core. It is noted that the ferrite core may improve inductance of some coils. In other embodiments, the ferrite core may be omitted. For instance, the ferrite core may be omitted to reduce the number of components, reduce material, reduce weight, or the like. In another aspect, the ferrite core may not noticeably enhance the inductance once the coil exceeds a certain length. It is noted that the coil may be formed in a helical structure of different lengths and turns.

At 1204, the coil may be attached to a capacitor. Attaching the coil to the capacitor may include attaching each end of the coil to terminals or plates of the capacitor. In an example, ends of the coil may be welded to the terminals of the capacitor.

At 1206, attach the capacitor to a product. The capacitor may be attached to an electrically conductive surface of a product. It is noted that the capacitor may be attached to electrically non-conductive products. Moreover, in various embodiments, the method 1200 may include providing one or more of an insulating liner, a space, a shield, or a housing.

In another aspect, the method 1200 may be accomplished with various manufacturing techniques, such as producing multiple EAS labels via a rolled sheet, a die cutting process or the like.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A detectable label comprising:
   a capacitor;
   a core and a coil surrounding the core, the coil comprising a first end and a second end, wherein the first end of the coil is coupled to a first plate of the capacitor and a second end of the coil is attached to a second plate of the capacitor to form an LC circuit;
   a shield disposed proximal to the capacitor; and
   a spacer disposed between the shield and the capacitor;

wherein a flux direction of the LC circuit is generally parallel with a surface when the detectable label is operatively attached to the surface.

2. The detectable label of claim 1, further comprising a core, wherein the coil is wound around the core.

3. The detectable label of claim 2, wherein the core comprises a ferrite material.

4. The detectable label of claim 1, further comprising a housing operatively housing the coil.

5. The detectable label of claim 1, further comprising an insulator disposed between the coil and the capacitor.

6. The detectable label of claim 1, wherein the coil comprises a copper wire.

7. The detectable label of claim 1, wherein the housing comprises a footprint of a size smaller than 20 mm×25 mm and resonating at a frequency of about 8.2 Hertz.

8. The detectable label of claim 1, wherein the housing comprises a footprint of a size smaller than 15 mm×20 mm and resonating at a frequency of about 8.2 Hertz.

9. The detectable label of claim 1, wherein the housing comprises a footprint of a about 40 mm×30 mm or less and resonating at a frequency of about 8.2 Hertz.

10. The detectable label of any of claim 1, wherein the label is detectable when applied to a product comprising a metal surface.

11. A system comprising
a product having an at least partially metallic surface; and
a detectable label comprising:
    a capacitor; and
    a core and a coil surrounding the core, the coil comprising a first end and a second end, wherein the first end of the coil is coupled to a first plate of the capacitor and a second end of the coil is attached to a second plate of the capacitor to form an LC circuit;
    a shield disposed proximal to the capacitor; and
    a spacer disposed between the shield and the capacitor;
    wherein a flux direction of the LC circuit is generally parallel with a surface when the detectable label is operatively attached to the surface, wherein the detectable label is detectable when applied to the product proximate the metallic surface.

12. The detectable label of claim 1, wherein the shield comprises a non-ferrous material.

13. The detectable label of claim 1, wherein the shield comprises aluminum.

14. The detectable label of claim 11, wherein the shield comprises a non-ferrous material.

15. The detectable label of claim 11, wherein the shield comprises aluminum.

* * * * *